(12) United States Patent  (10) Patent No.: US 10,695,921 B2
Wong  (45) Date of Patent: Jun. 30, 2020

(54) SHEARING TOOL WITH A COMPOUND LEVER MECHANISM

(71) Applicant: KING'S FLAIR MARKETING LIMITED, Road Town, Tortola (VG)

(72) Inventor: Siu Wah Wong, Hong Kong (HK)

(73) Assignee: KING'S FLAIR MARKETING LIMITED, Road Town, Tortola (VG)

( * ) Notice: Subject to any disclaimer, the term of this patent is extended or adjusted under 35 U.S.C. 154(b) by 97 days.

(21) Appl. No.: 16/021,792

(22) Filed: Jun. 28, 2018

(65) Prior Publication Data

US 2019/0001512 A1 Jan. 3, 2019

Related U.S. Application Data

(60) Provisional application No. 62/526,668, filed on Jun. 29, 2017.

(51) Int. Cl.
*B26B 13/28* (2006.01)
*B26B 13/04* (2006.01)
*B26B 13/26* (2006.01)
*A01G 3/025* (2006.01)
*A01G 3/02* (2006.01)

(52) U.S. Cl.
CPC ............ *B26B 13/28* (2013.01); *A01G 3/02* (2013.01); *A01G 3/0255* (2013.01); *B26B 13/04* (2013.01); *B26B 13/26* (2013.01)

(58) Field of Classification Search
CPC . A01G 3/025; A01G 3/00; A01G 3/02; A01G 3/021; A01G 3/0251; A01G 3/0255; B26B 13/28; B26B 13/04; B26B 13/26; B26B 13/00; B26B 13/12
USPC .................. 30/251, 194, 244, 250, 252, 254
See application file for complete search history.

(56) References Cited

U.S. PATENT DOCUMENTS

| | | | |
|---|---|---|---|
| 2003/0136008 A1* | 7/2003 | Lin ...................... | A01G 3/0251 30/250 |
| 2007/0079512 A1* | 4/2007 | Nelson ................. | A01G 3/0251 30/123.3 |
| 2012/0151781 A1* | 6/2012 | Huang ................. | A01G 3/0251 30/251 |
| 2013/0008563 A1* | 1/2013 | Reh ...................... | A01G 3/0251 144/24.13 |
| 2014/0215834 A1* | 8/2014 | Wang .................... | A01G 3/021 30/251 |
| 2016/0270299 A1* | 9/2016 | Lin ...................... | A01G 3/0251 |

* cited by examiner

*Primary Examiner* — Phong H Nguyen
(74) *Attorney, Agent, or Firm* — Browdy and Neimark, P.L.L.C.

(57) ABSTRACT

The present invention relates to a shearing tool such as scissors, comprising first and second cutting members pivotally coupled with each other, and a linkage pivotally coupled to the first and second cutting members, whereby the linkage and one of the first and second cutting members form together a compound lever mechanism. A force applied by an operator onto the shearing tool increases as an output by the linkage, and the increasing force is conveyed to that cutting member so that the cutting power of the shearing tool increase to allow hard-to-cut materials to be cut manually and easily with less effort from the operator.

15 Claims, 8 Drawing Sheets

SHEARING TOOL WITH A COMPOUND LEVER MECHANISM

TECHNICAL FIELD OF THE INVENTION

This invention relates to a shearing tool, and particularly to scissors, having a lever mechanism to allow for faster and easier operation of the shearing tool requiring less force.

BACKGROUND OF THE INVENTION

Shearing tools find a wide range of applications in our daily life. One type of the shearing tools is scissors. Scissors are hand-operated shearing tools. There are many forms of scissors designed for different purposes available in the market. Types of scissors range from office scissors for cutting thin materials such as paper, cardboard and rope, to kitchen scissors for cutting bones and flesh as well as other specialized scissors for cutting hair, wire, cloth, bandage etc. Conventional scissors usually include two cutting members, each with a blade portion at one end and a handle portion at the other end. In general, the two cutting members crossed at a pivot positioned at the middle of the scissors. The two blade portions of the cutting members can pivotally move away from and towards each other in an open position and a closed position to cut an object to be cut.

Mechanically, conventional scissors are a first-class lever with the pivot acting as the fulcrum. When cutting thick or hard materials such as thick cardboards and bones, it is common for the operator to move the object to be cut as close to the fulcrum as possible to maximize the mechanical advantage of the lever. However, even so, the force required for cutting thick and strong material with conventional scissors is big and it is difficult and tiring for the operator especially during continues and repeating operation of the scissors.

On the other hand, some specialized scissors, such as kitchen scissors required to be washed and cleaned every time after use. However, the blades of conventional scissors are usually either fixedly attached to each other or detachably attached by pivot screw. This not only requires the use of tool for removing and replacing the blades, but also removing and replacing the screw may alter the position of the blade and affect the cutting action of the blades.

Therefore, there is a need for a shearing tool that is operated easier and faster and required less force by the operator when in use and a shearing tool that can be separated and replaced conveniently without the use of tools.

SUMMARY OF THE INVENTION

An object of the present invention is to provide an improved shearing tool such as scissors that requires less effort to operate than conventional scissors in the art. The shearing tool includes two cutting members configured to comprise a compound lever mechanism through which the force applied by the operator would be amplified. This in turn increases the cutting power of the shearing tool, thus, allowing hard-to-cut materials to be cut manually and easily with less effort from the operator.

Another object of the invention is to provide a shearing tool such as scissors, wherein the two blades can be separated from each another and from the handles easily by the operator without any tools. So all parts of the scissors can be washed, cleaned and dried separately. In this way, the overlapped portion of the two blades can also be cleaned and dried, which prevents formation of dirt or rust around those areas covered by the other blade in ordinary scissors. This allows proper maintenance of the scissors and in turn increases the working life span of the scissors.

Yet another object of the invention is to provide a shearing tool such as scissors, wherein the two blades can be separated and replaced without altering the original position and cutting action of the blades such that the frictional contact between the cutting edges of the blades can be maintained.

The present invention has been developed to fulfill the needs noted above. A first aspect of the invention is to provide a shearing tool, comprising:
- a first cutting member comprising a first blade portion, a first handle portion coupled to the first blade portion, and a guide pivot arranged on the first blade portion;
- a second cutting member comprising a second blade portion pivotally coupled to the first blade portion by a first pivot that is spaced apart from the guide pivot along a length direction of the first blade portion, and a second handle portion; and
- a linkage which forms a compound lever mechanism together with one of the first and second cutting members.

The linkage may comprise:
- a pivotal end portion pivotally coupled to the second blade portion by a second pivot,
- a fixed end portion coupled to the second handle portion, and
- a link portion connecting the pivotal end portion and the fixed end portion, such that the second blade portion is pivotally coupled to the second handle portion through the linkage by the second pivot, and
- a slot formed through the link portion,
- wherein the guide pivot of the first blade portion is arranged to pass through the slot in such a way that allows for slidable movement of the guide pivot within the slot in a longitudinal direction of the slot, which slidable movement in turn causes pivotal movement of the first and second blade portions relative to one another between a closed position of the shearing tool and an open position of the shearing tool, throughout a pivotal movement process of the linkage about the guide pivot relative to the first blade portion.

In one embodiment of the invention, a distance between the guide pivot and the second blade portion may increase along with the pivotal movement of the first and second blade portions from the closed position of the shearing tool to the open position of the shearing tool. Preferably, the guide pivot is spaced away from the second blade portion at the greatest distance when the shearing tool is in a fully open position.

Advantageously, the second blade portion may comprise a curved cutout which is sized and shaped to allow the guide pivot to move passed the second blade portion without coming into contact with the second blade portion.

In another embodiment of the invention, the first cutting member is detachably coupled to the second cutting member through the first pivot and the guide pivot. The first pivot may include a first pin detachably and pivotally coupled to a pin hole formed through the second blade portion, and the guide pivot may include a guide pin detachably and pivotally coupled to the slot of the linkage. Preferably, the first pin may be configured to have two lips or rims extending from opposite side walls of an upper portion of the first pin, and a first chamfer provided around an edge of the pin hole of the second blade portion is adapted to hold the first pin in the pin hole of the second blade portion by allowing at least a part of the two lips or rims of the first pin to sit on the first chamfer. Similarly, the guide pin may be configured to have two lips or rims extending from opposite side walls of an upper portion of the guide pin, and a second chamfer provided around an edge of the slot of the linkage is adapted to hold the guide pin in the slot of the linkage by allowing at least a part of the two lips or rims of the guide pin to sit on the second chamfer.

In one preferred embodiment of the invention, a combination of the first pin, the guide pin, the pin hole of the second blade portion, and the slot of the linkage is configured in a way that the first and second cutting members are separated from each when the shearing tool is in a fully open position.

In comparison with the prior art shearing tools, the shearing tool of present invention is characterized by the linkage which is pivotally coupled to the blade portion of one of the cutting members, wherein the linkage and the blade portion pivotally coupled with each other form two levers, in such a way that the linkage and the blade portion together form a compound lever mechanism. If an operator applies a force to the linkage (i.e. the first lever), the linkage would output an increasing force which immediately serves as an input force applied by the first lever onto the blade portion (i.e. the second lever), and the increasing force applied would then be transmitted to and act on the materials to be cut, i.e. the force acting on the materials increases accordingly. In this way, the shearing tool of the invention is operated faster and with an ease.

DETAILED DESCRIPTION OF THE INVENTION

While this invention is illustrated and described in preferred embodiments, the shearing of the present invention may be produced in many different configurations, sizes, forms and materials.

Figure 1:
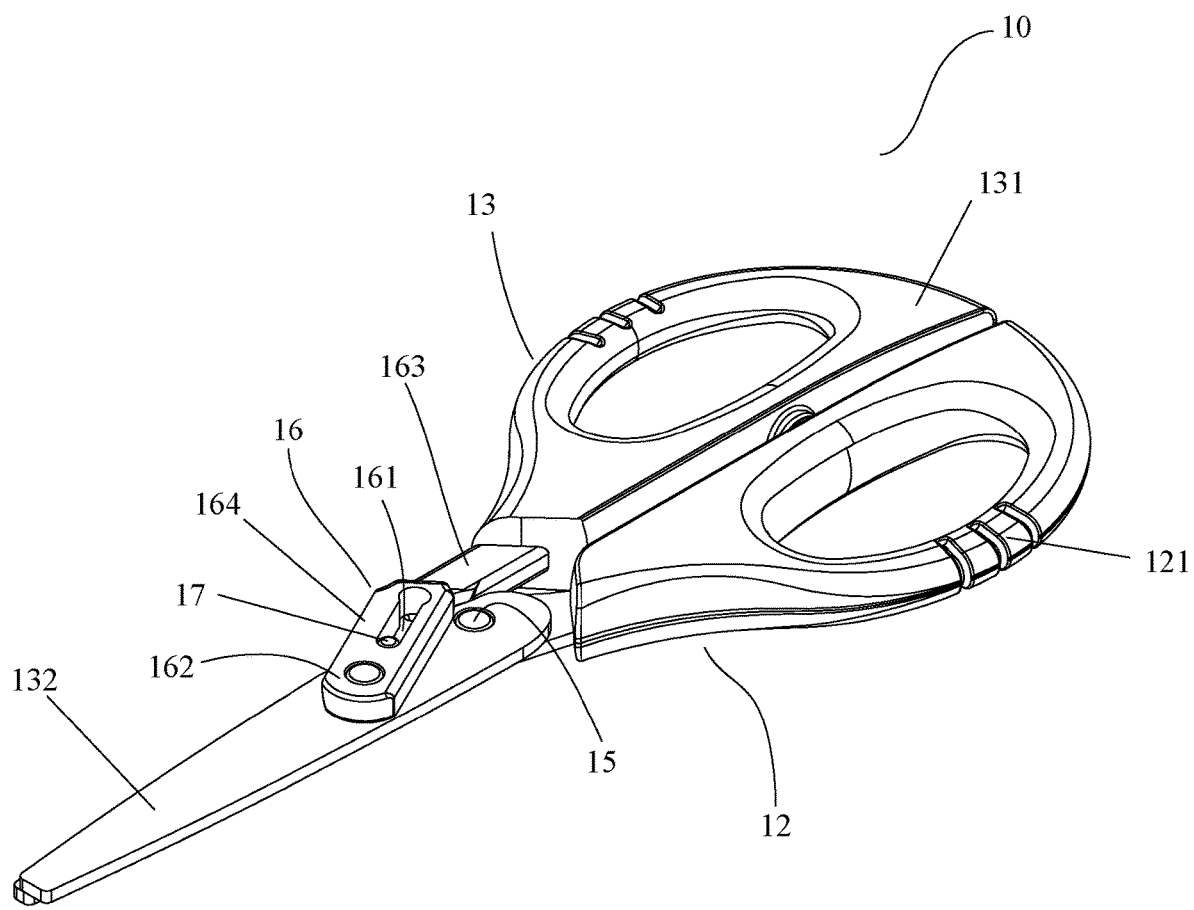
FIG. 1 is a perspective view of the scissors constructed according to a first embodiment of the present invention.
Figure 2:
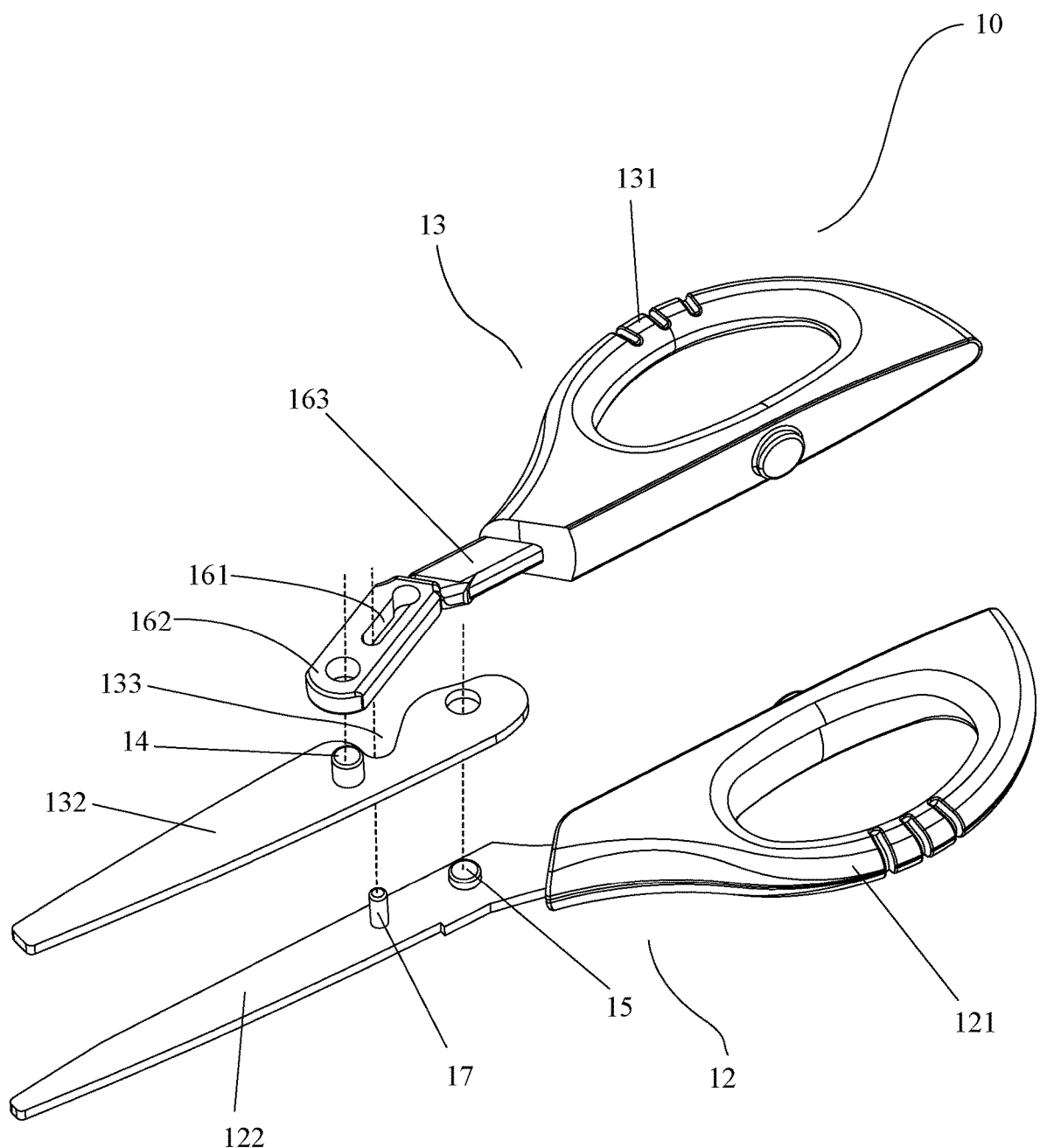
FIG. 2 is an exploded perspective view of the scissors shown in FIG. 1.

Referring now to the drawings, FIGS. 1 to 2 show in a schematic manner scissors 10 constructed according to a first embodiment of the present invention. As shown in FIGS. 1 to 2, the scissors 10 comprise a first cutting member 12 and a second cutting member 13. The first cutting member 12 includes a first handle portion 121, a first blade portion 122 coupled to the first handle portion 121, and a guide pivot 17 arranged on the first blade portion 122. The first blade portion 122 may be fixedly or removably inserted into the first handle portion 121 to form the first cutting member 12. The second cutting member 13 comprises a second handle portion 131, and a second blade portion 132 pivotally coupled to the first blade portion 122 by a first pivot 15 arranged on the first blade portion 122. The first pivot 15 and the guide pivot 17 are arranged in spaced apart fashion along a length direction of the first blade portion 122. The first pivot 15 and the guide pivot 17 each may be formed by a pin or a rivet or the like.

The scissors 10 further comprise a linkage 16 which has a pivotal end portion 162 pivotally coupled to the second blade portion by a second pivot 14 arranged on the second blade portion 132; a fixed end portion 163 coupled to the second handle portion 131; a link portion 164 connecting the pivotal end portion 162 and the fixed end portion 163; and a longitudinal slot 161 formed through the link portion 164 in a length direction of the link portion 164. The fixed end portion 163 may be fixedly or removably inserted into the second handle portion 131. The second blade portion 132 is pivotally coupled to the second handle portion 131 through the linkage 16 by the second pivot 14 such as pin or a rivet or the like.

The handle portions 121 and 131 of the scissors each includes an opening configured to receive at least a thumb or a finger of the operator. It can be easily understood by those skilled in the art that the shape and size of the first and the second blades are not limited to the shape and size as shown in FIGS. 1 to 3. The first and the second blades of the present invention may have different shapes and sizes configured to cut different objects as desired.

As shown in FIG. 1, the second blade portion 132 of the second cutting member 13 is also pivotally coupled to the first blade portion 122 by the first pivot 15. The linkage 16 is also pivotally coupled to the first blade portion 122 by the guide pivot 17 which is able to slide within the longitudinal slot 161 of the linkage 16 on the right side of the second pivot 14 viewed in FIGS. 1 and 2. During the operation of the scissors, the linear sliding movement of the guide pivot 17 along the longitudinal slot 161 can in turn drive the second blade portion 132 to pivot between a closed position and an open position about the first pivot 15. When a force is applied by an operator onto the handle portions 121 and 131, by pushing at the thumb and pulling with the fingers, the linkage 16 would output an increasing force; the increasing output force is immediately applied to the second blade portion 132, and the force transmitted from the linkage 16 to the second blade portion 132 further increases. Therefore, the linkage 16 and the second blade portion 132 respectively form two levers which constitute a compound levers structure. With such a compound lever structure, the object would be easier to be cut and requires less effort. Put simply, the further away the applied force from the fulcrum, the stronger or the bigger the cutting force at the cutting location. The compound lever structure of the present invention increases the length between the effort point (i.e. where the operator's hold the scissors) and the pivot or fulcrum, thereby increasing the cutting power of the scissors.

Figure 3A:
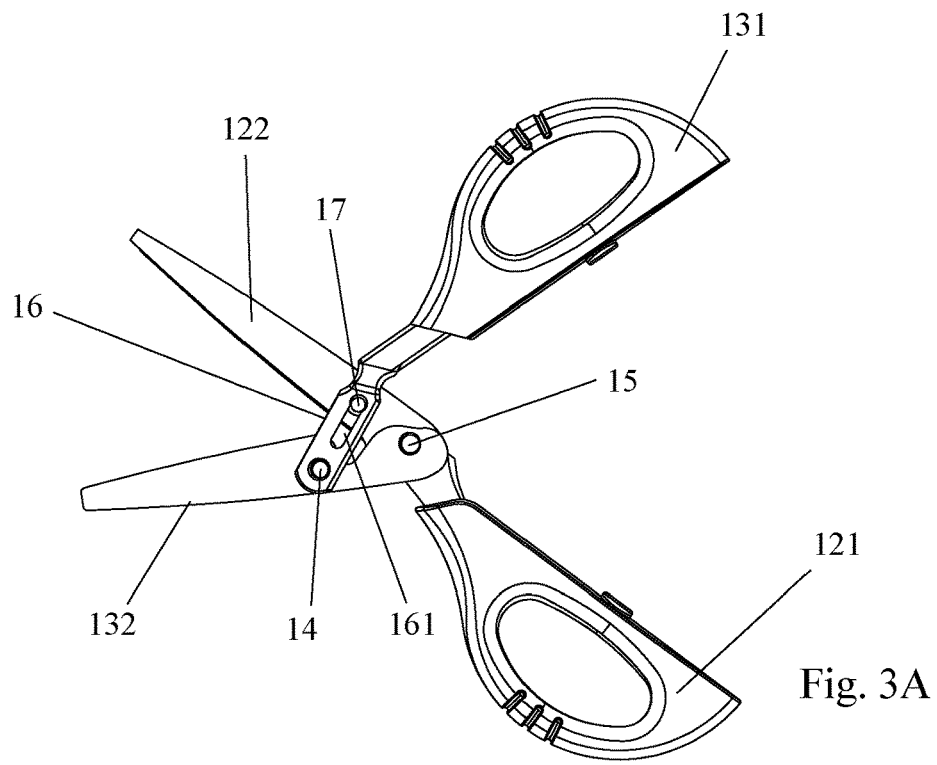
FIG. 3A to FIG. 3C are schematic views of the scissors shown in FIG. 1 illustrating the movement of the scissors from an open position to a closed position.
Figure 3B:
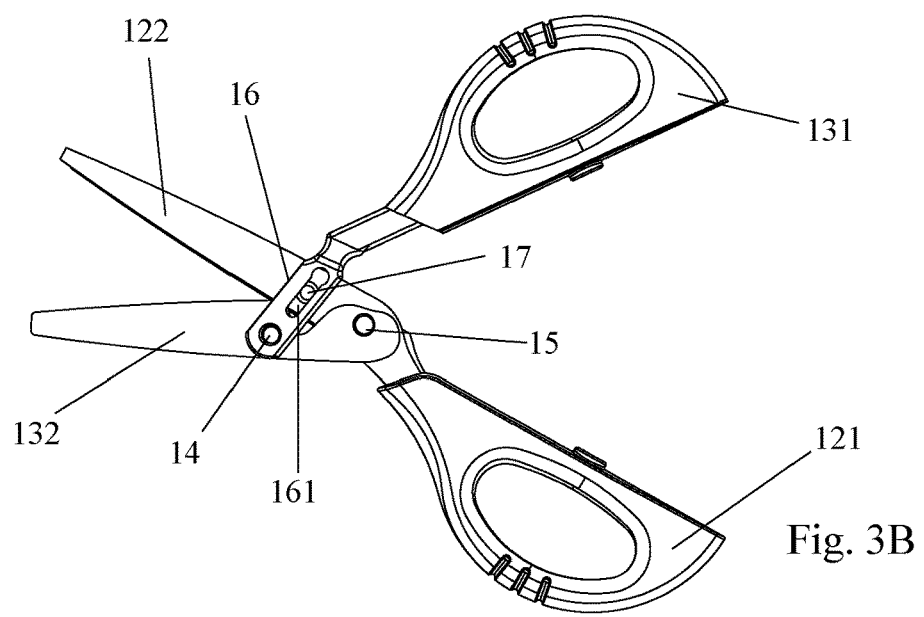
Figure 3C:
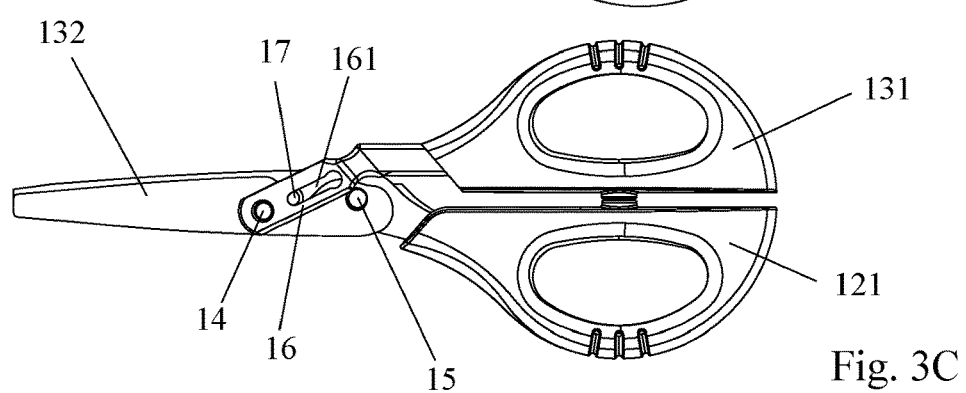

Referring now to FIG. 3A to FIG. 3C, there is illustrated the movement of the scissors 10 from the fully open position to the fully closed position. As illustrated, the guide pivot 17 actually is a sliding pivot point, the position of which in the longitudinal slot 161 is variable in a pivoting cycle of the second cutting member 13. When the scissors 10 is in the fully open position (FIG. 3A), the sliding pivot point is at the top end of the slot 161, where the sliding pivot point is spaced away from the second blade portion 132 at the greatest distance. As the operator pushes and pulls the two handle portions 121 and 131 towards each another, the sliding pivot point moves along the longitudinal slot 161 towards the second blade portion 132 to reach the middle of the slot 161 (FIG. 3B); the sliding pivot point continues to move along the longitudinal slot 161 until the sliding pivot point reaches the lowest end of the slot 16, where the scissors 10 is in the fully closed position (FIG. 3C).

It can be understood that, as the guide pivot 17 (the sliding pivot point) moves closer to the second blade portion 132 when the scissors moves from the open position to the closed position, the distance between the effort point (the place where the operator holds the scissors and applies the force) and the fulcrum (i.e. the guide pivot 17) increases. As the distance between the effort point and the guide pivot 17 increases, the cutting power at the blade portions 122, 132 would increases. In other words, the greater the distance between the effort point and the guide pivot 17, the greater the cutting power is generated. Therefore, it can be understood that the greatest cutting power is generated when the scissors is at the closed position during cutting operation.

As can be seen in FIG. 2, the second blade portion 132 further includes a curved cutout 133 provided between the second pivot 14 and a hole for receiving the first pivot 15. This curved cutout 133 allows the guide pivot 17 to move passed the second blade portion 132 without touching the outer edge of the second blade portion 132.

Figure 4:
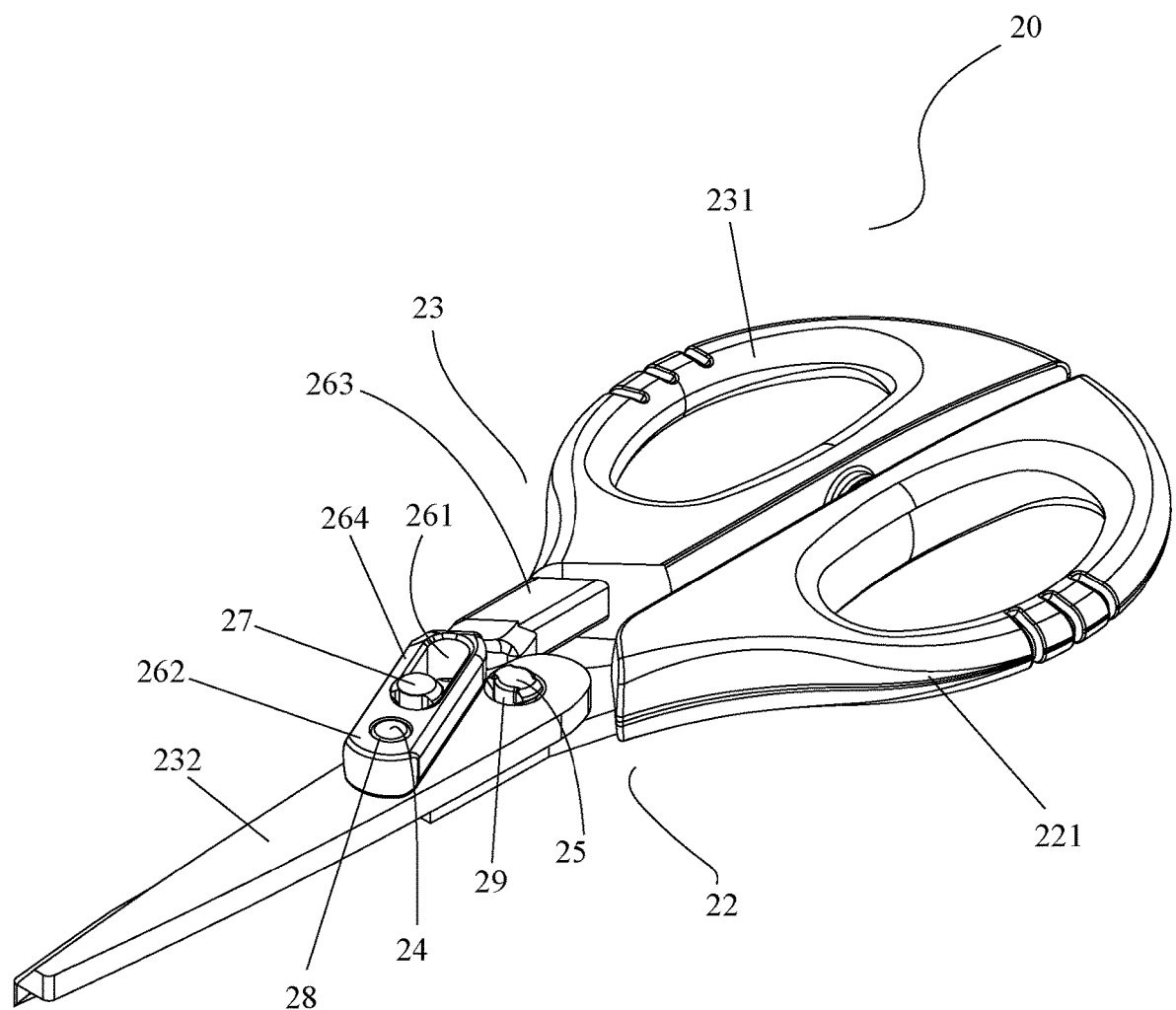
FIG. 4 is a perspective view of the scissors constructed according to a second embodiment of the present invention.
Figure 5:
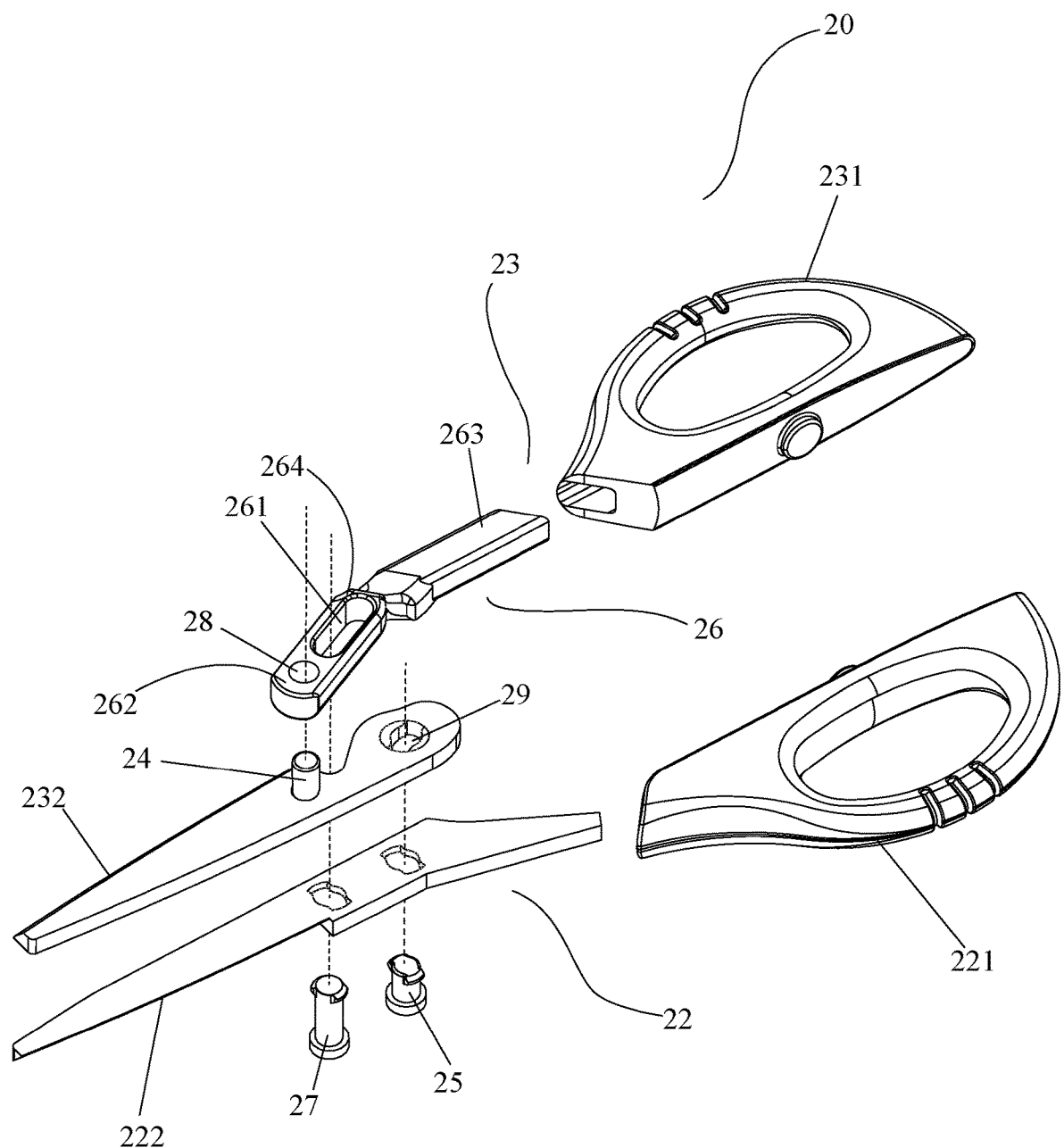
FIG. 5 is an exploded perspective view of the scissors shown in FIG. 4.

FIGS. 4 to 5 show in a schematic manner scissors 20 constructed according to a second embodiment of the present invention. The scissors 20 have the same compound leverage mechanism as the first embodiment discussed above. Specifically, the scissors 20 comprise a first cutting member 22, a second cutting member 23 and a linkage 26, which are arranged in a similar manner as discussed in the first embodiment above. The first cutting member 22 includes a first handle portion 221, a first blade portion 222 coupled to the first handle portion 221, and a guide pivot arranged on the first blade portion 222. The second cutting member 23 comprises a second handle portion 231, and a second blade portion 232 pivotally coupled to the first blade portion 222 by a first pivot arranged on the first blade portion 222. The linkage 26 has a pivotal end portion 262 pivotally coupled to the second blade portion 232 by a second pivot, a fixed end portion 263 coupled to the second handle portion 231, a link portion 264, and a longitudinal slot 261 formed through the link portion 264.

Figure 7A:
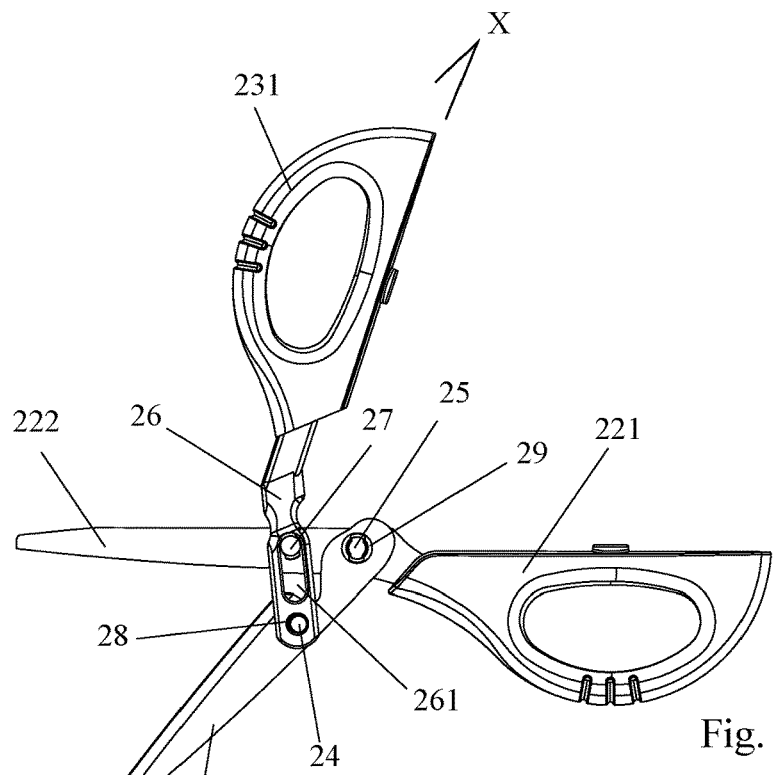
FIG. 7A to FIG. 7C are schematic views of the scissors shown in FIG. 4 illustrating the movement of the scissors from an open position to a closed position.
Figure 7B:
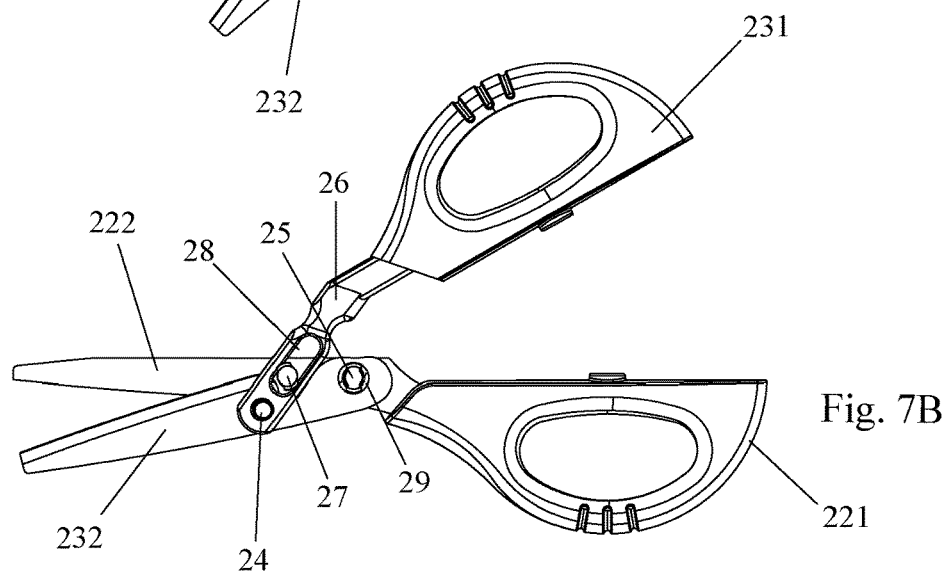
Figure 7C:
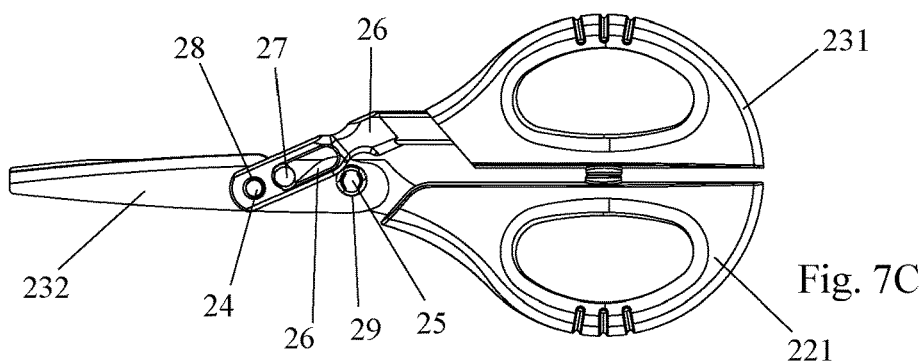

FIG. 7A to FIG. 7C show the movement of the scissors 20 from the fully open position to the fully closed position. How the three pivots are arranged and work together to form the compound leverage mechanism may be made reference to the description of FIG. 3A to FIG. 3C and is not elaborated herein.

This second embodiment differs from the first embodiment in that, the first cutting member 22 is detachably coupled to the second cutting member 23 through the first pivot provided as a first pin 25 and the guide pivot provided as a guide pin 27. The first pin 25 and the guide pin 27 both are arranged on the first blade portion 222 in spaced-apart fashion. The linkage 26 is pivotally coupled to the second blade portion 232 at a through hole 28 by the second pivot such as a second pin 24. The second blade portion 232 is further detachably and pivotally coupled to the first blade portion 222 at a pin hole 29 by the first pin 25. The first blade portion 222 is further detachably and pivotally coupled to the linkage 26 at a longitudinal slot 261 by the guide pin 27.

Figure 6:
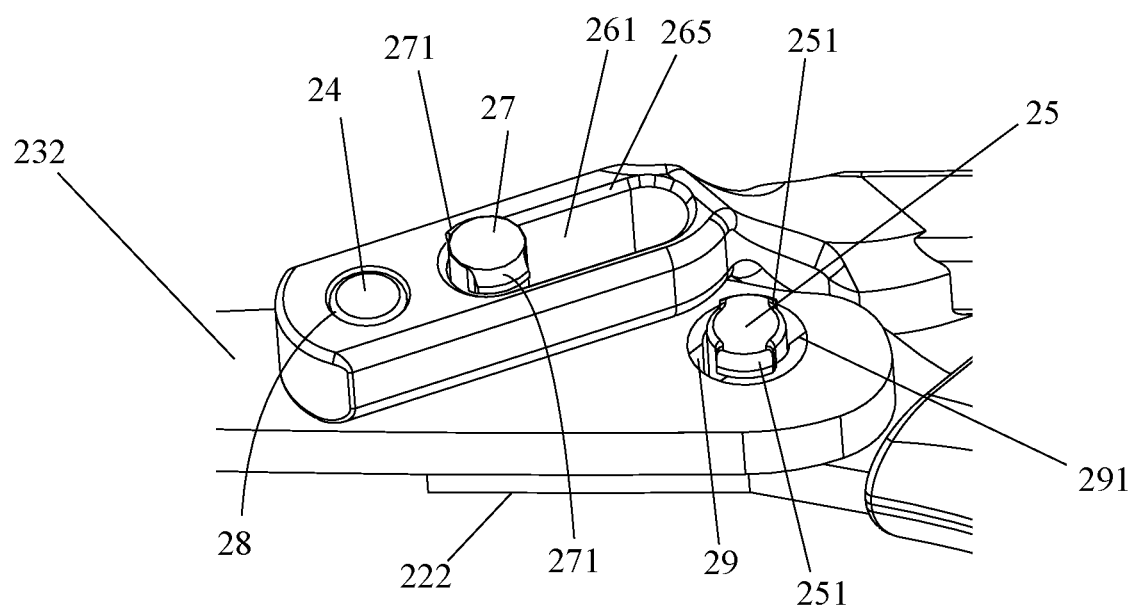
FIG. 6 is an enlarged view of the three pivots of the scissors shown in FIG. 4

FIG. 6 shows an enlarged view of all three pivots of the scissors 20. To achieve the detachment of the first cutting member 22 and the second cutting member 23 without the use of any tools, the first pin 25 is configured to have a circular cross section with two lips or rims 251 extending from opposite side walls of an upper portion of the first pin 25. The two lips or rims 251 have a width adapted to the height of a first chamfer 291 provided around the edge of the pin hole 29. The first chamfer 291 is adapted to hold the first pin 25 in the pin hole 29 by allowing the two lips or rims 251 or a part of the two lips or rims 251 to sit on the chamfer 291 during the operation of the scissors.

Likewise, the guide pin 27 is configured to have a circular cross section with two lips or rims 271 extending from opposite side walls of an upper portion of the guide pin 27. The two lips or rims 271 have a width adapted to the height of a second chamfer 265 provided around the edge of the longitudinal slot 261. The second chamfer 265 is adapted to hold the guide pin 27 in the slot 261 by allowing the two lips or rims 271 or a part of the two lips or rims 271 to sit on the second chamfer 265 of the slot 261 during the operation of the scissors.

Figure 8A:
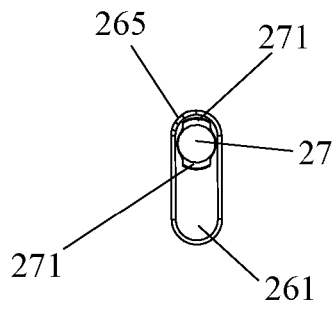
FIG. 8A to FIG. 8C are schematic views of the guide pin and the slot in correspondence to FIGS. 7A to 7C illustrating the movement of the guide pin from the open position to the closed position.
Figure 8B:
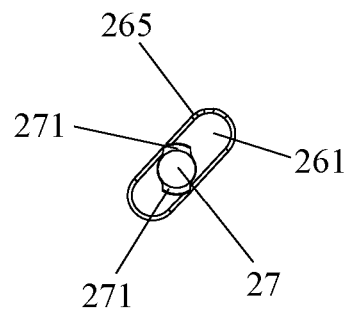
Figure 8C:
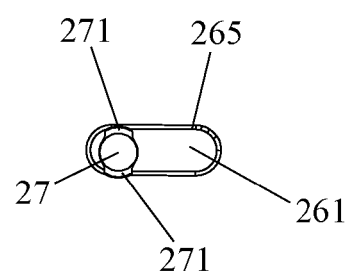
Figure 9:
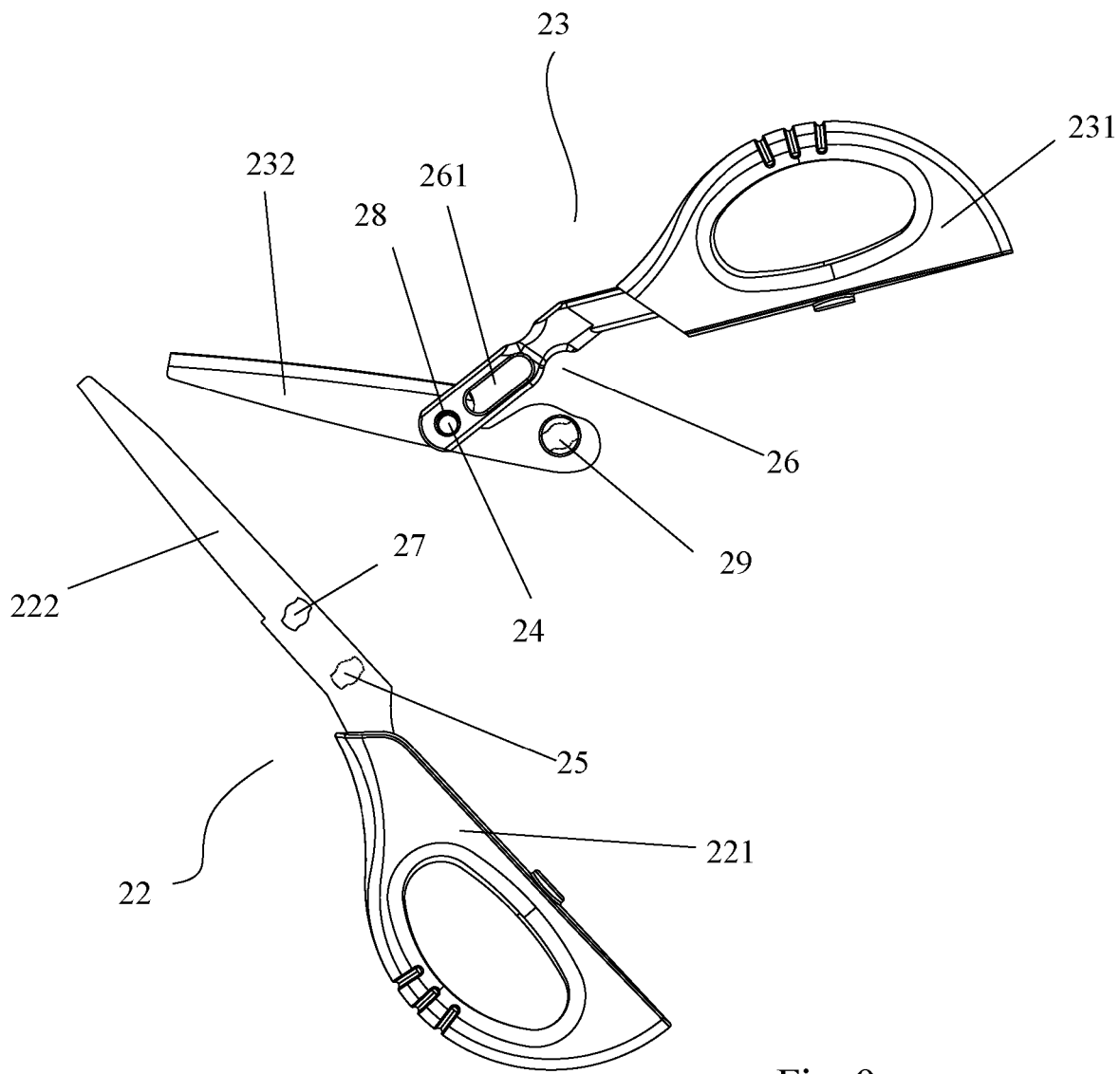
FIG. 9 is a schematic view of the scissors shown in FIG. 4 illustrating the first cutting member is separated from the second cutting member.

FIGS. 7A to 7C show three positions of the scissors 20 from the fully open position to the fully closed position. FIGS. 8A to 8C show the close-ups of the guide pin 27 and the slot 26 in correspondence to the three positions of the scissors 20 shown in FIGS. 7A to 7C. As shown in FIG. 7C and 8C, when the scissors 20 are at the fully closed position, the guide pin 27 is perpendicular or at 90° to the length of the slot 261. That is the two lips or rims 271 of the guide pin 27 are positioned on the second chamfer 265, holding the guide pin 27 in the slot 26, thereby holding the first cutting member 22 and the second cutting member 23 together during the cutting operation. As the scissors move from the closed position to the open position, the second handle portion 231 and the linkage 26 move away from the first handle portion 221 by rotating towards an opposite direction. As the linkage 26 rotates, the slot 261 also rotates against the guide pin 27 which is fixedly attached to the first blade portion 222. As can be seen in FIG. 7B and 8B, when the guide pin 27 and the slot 26 move against each other between the fully open position of the scissor and the fully closed position, the guide pin 27 is in a position where at least part of the two lips or rims 271 of the guide pin 27 is in contact with the second chamfer 265 and thereby holding the guide pin 27 in the slot 26. When the scissors 20 are in the fully opened position (FIG. 7A and 8A), the guide pin 27 has reached the top end of the slot 261 where only one of the two lips or rims 271 of the guide pin 27 remains in contact with the second chamfer 265. This allows the guide pin 27 to be easily dislodged from the slot 261 by slightly moving the second cutting member backwards, in the direction X along the length of the slot 261, away from the guide pin 27, and thereby separating the first cutting member 22 from the second cutting member 23. FIG. 9 shows in a schematic manner the scissors 20 when the first cutting member 22 is separated from the second cutting member 23.

It would be appreciated that the shape and design of the slot 261 is not limited to the I-shaped elongate slot as shown in FIGS. 5 to 9. For example, the slot 261 can also be configured to include at its distal end spaced away from the second pin 24, a circular head with a diameter larger than the width of the rest of the slot and the diameter of the guide pin 27. In this way, the guide pin can be detached from the slot 26 when the scissors are in the fully opened position. It would also be understood that the slot 261, the pin hole 29, the first pin 25 and the guide pin 27 of the scissors can adapt any other shapes or designs that would allow the pins to be detached therefrom when the scissors are not in use.

The first pin 25 can be attached to and detached from the pin hole 29 in a similar mechanism as discussed above for the guide pin 27. As can be seen in FIG. 5 and FIG. 9, the pin hole 29 is sized and shaped to permit passage of the first pin 25 therethrough. The pin hole 29 further includes a first chamfers 291 at each side of the pin hole 29 configured to receive the two lips or rims 251 of the first pin 25 during the operation of the scissors. When the scissors 20 are in the fully open position, the first pin 25 rotates to a position where the two lips or rims 251 of the first pin 25 are no longer in contact with the first chamfers 291, such that the first pin 25 can be detached from the pin hole 29, thereby allowing the first cutting member 22 to be separated from the second cutting member 23.

After cleaning or sharpening of the first and second blade portions 222, 232, the first cutting member 22 and the second cutting member 23 can be put back together by placing the first pin 25 back into the pin hole 29 and the guide pin 27 back into the slot 261.

In summary, the scissors of the present invention having a compound leverage mechanism as described above comprises two pin pivots and a guide pivot which work together to provide a cutting power that is greater than conventional scissors with a single first class lever. Another characterizing feature of the invention is that the pivot pins and the holes and slots for receiving the pivots pins of the scissors are configured in a way that the cutting members of the scissors can be separated from each other when the scissors is in its fully open position manually without the use of any tools.

Thus, the present invention provides a shearing tool such as scissors with greater cutting power and thus requires less effort when used. It can be used to cut thick and hard objects easily and with less effort. Further, the present invention also provides the scissors that the blades can be separate from each other manually and conveniently for cleaning and sharpening. The blades can also be replaced manually without altering the original fitted position of the two blades, thus the cutting efficiency of the blades will not be affected.

Having sufficiently described the nature, major features and advantages of the present invention according to some preferred embodiments, the invention, however, should not be limited to the structures and functions of the embodiments and drawings. It is stated that insofar as its basic principle is not altered, changed or modified it may be subjected to variations of detail. Numerous variations and modifications that are easily obtainable by means of the skilled person's common knowledge without departing from the scope of the invention should fall into the scope of this invention.

NUMERICAL REFERENCES 10 scissors
12 first cutting member
121 first handle portion
122 first blade portion
13 second cutting member
131 second handle portion
132 second blade portion
133 curved cutout
14 second pivot
15 first pivot
16 linkage
161 slot
162 pivotal end portion
163 fixed end portion
164 link portion
17 guide pivot
20 scissors
22 first cutting member
221 first handle portion
222 first blade portion
23 second cutting member
231 second handle portion
232 second blade portion
24 second pin
25 first pin
251 lip or rim
26 linkage
261 slot
262 pivotal end portion
263 fixed end portion
264 link portion
265 second chamfer
27 guide pin
271 lip or rim
28 through hole
29 pin hole
291 first chamfer

What is claimed is:

1. A shearing tool comprising:
    a first cutting member comprising a first blade portion, a first handle portion coupled to the first blade portion, and a guide pivot arranged on the first blade portion;
    a second cutting member comprising a second blade portion pivotally coupled to the first blade portion by a first pivot that is spaced apart from the guide pivot along a length direction of the first blade portion, and a second handle portion; and
    a linkage comprising:
        a pivotal end portion pivotally coupled to the second blade portion by a second pivot,
        a fixed end portion coupled to the second handle portion, and
        a link portion connecting the pivotal end portion and the fixed end portion, such that the second blade portion is pivotally coupled to the second handle portion through the linkage by the second pivot, and
        a slot formed through the link portion,
    wherein the guide pivot of the first blade portion is arranged to pass through the slot in such a way that allows for slidable movement of the guide pivot within the slot in a longitudinal direction of the slot, which slidable movement in turn causes pivotal movement of the first and second blade portions relative to one another between a closed position of the shearing tool and an open position of the shearing tool, throughout a pivotal movement process of the linkage about the guide pivot relative to the first blade portion.

2. The shearing tool of claim 1, wherein a distance between the guide pivot and the second blade portion increases along with the pivotal movement of the first and second blade portions from the closed position of the shearing tool to the open position of the shearing tool.

3. The shearing tool of claim 2, wherein the guide pivot is spaced away from the second blade portion at the greatest distance when the shearing tool is in a fully open position.

4. The shearing tool of claim 2, wherein the second blade portion comprises a curved cutout which is sized and shaped to allow the guide pivot to move passed the second blade portion without coming into contact with the second blade portion.

5. The shearing tool of claim 1, wherein the second blade portion comprises a curved cutout which is sized and shaped to allow the guide pivot to move passed the second blade portion without coming into contact with the second blade portion.

6. The shearing tool of claim 5, wherein the second blade portion comprises a curved cutout which is sized and shaped to allow the guide pivot to move passed the second blade portion without coming into contact with the second blade portion.

7. The shearing tool of claim 1, wherein the first cutting member is detachably coupled to the second cutting member through the first pivot and the guide pivot.

8. The shearing tool of claim 7, wherein the first pivot includes a first pin detachably and pivotally coupled to a pin hole formed through the second blade portion, and the guide pivot includes a guide pin detachably and pivotally coupled to the slot of the linkage.

9. The shearing tool of claim 8, wherein the first pin is configured to have two lips or rims extending from opposite side walls of an upper portion of the first pin, and a first chamfer provided around an edge of the pin hole of the second blade portion is adapted to hold the first pin in the pin hole of the second blade portion by allowing at least a part of the two lips or rims of the first pin to sit on the first chamfer.

10. The shearing tool of claim 9, wherein the guide pin is configured to have two lips or rims extending from opposite side walls of an upper portion of the guide pin, and a second chamfer provided around an edge of the slot of the linkage is adapted to hold the guide pin in the slot of the linkage by allowing at least a part of the two lips or rims of the guide pin to sit on the second chamfer.

11. The shearing tool of claim 8, wherein the guide pin is configured to have two lips or rims extending from opposite side walls of an upper portion of the guide pin, and a second chamfer provided around an edge of the slot of the linkage is adapted to hold the guide pin in the slot of the linkage by allowing at least a part of the two lips or rims of the guide pin to sit on the second chamfer.

12. The shearing tool of claim 8, wherein the first pin and the guide pin each is configured to have a circular cross section with the two lips or rims, respectively.

13. The shearing tool of claim 8, wherein a combination of the first pin, the guide pin, the pin hole of the second blade portion, and the slot of the linkage is configured in a way that the first and second cutting members are separated from each when the shearing tool is in a fully open position.

14. The shearing tool of claim 7, wherein a combination of the first pin, the guide pin, the pin hole of the second blade portion, and the slot of the linkage is configured in a way that the first and second cutting members are separated from each when the shearing tool is in a fully open position.

15. The shearing tool of claim 1, wherein the shearing tool is provided as scissors.

* * * * *